(12) United States Patent
Tao et al.

(10) Patent No.: US 10,165,198 B2
(45) Date of Patent: Dec. 25, 2018

(54) DUAL BAND ADAPTIVE TONE MAPPING

(71) Applicant: Samsung Electronics Co., Ltd., Suwon-si (KR)

(72) Inventors: Li Tao, Mountain View, CA (US); Yeong-Taeg Kim, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/986,553

(22) Filed: Dec. 31, 2015

(65) Prior Publication Data

US 2016/0360172 A1 Dec. 8, 2016

Related U.S. Application Data

(60) Provisional application No. 62/170,042, filed on Jun. 2, 2015.

(51) Int. Cl.
*H04N 9/64* (2006.01)
*H04N 5/265* (2006.01)
*H04N 9/68* (2006.01)
*G06T 5/00* (2006.01)

(52) U.S. Cl.
CPC ............ *H04N 5/265* (2013.01); *G06T 5/007* (2013.01); *H04N 9/68* (2013.01)

(58) Field of Classification Search
CPC .......... H04N 9/64; H04N 9/646; H04N 5/265; H04N 9/68
USPC ................................. 348/575, 649, 453, 441
See application file for complete search history.

(56) References Cited

U.S. PATENT DOCUMENTS

| | | | |
|---|---|---|---|
| 7,747,098 B2 * | 6/2010 | Ward | H04N 19/30 382/232 |
| 8,391,598 B2 | 3/2013 | Lin | |
| 8,437,545 B1 | 5/2013 | Maxwell et al. | |
| 8,879,849 B2 | 11/2014 | Friedhoff et al. | |
| 8,928,686 B2 * | 1/2015 | Messmer | H04N 1/6058 345/590 |
| 9,076,252 B2 | 7/2015 | Safaee-Rad et al. | |
| 9,105,078 B2 | 8/2015 | Lim et al. | |
| 2008/0043033 A1 * | 2/2008 | Winger | G09G 5/02 345/591 |
| 2009/0167751 A1 | 7/2009 | Kerofsky | |
| 2012/0170843 A1 | 7/2012 | Lin | |

(Continued)

FOREIGN PATENT DOCUMENTS

| | | |
|---|---|---|
| EP | 2750101 A1 | 7/2014 |
| WO | 2014/043005 A1 | 3/2014 |

OTHER PUBLICATIONS

International Search Report dated Apr. 6, 2017 in connection with International Patent Application No. PCT/KR2016/015245.

(Continued)

*Primary Examiner* — Trang U Tran

(57) ABSTRACT

A method, apparatus, and computer-readable medium for video tone mapping. The method includes processing video data into a first video component and a second video component and applying tone mapping to the first video component. The method further includes scaling the second video component. The method further includes generating a tone mapped video by combining the tone-mapped first video component with the scaled second video component.

16 Claims, 7 Drawing Sheets

(56) References Cited

U.S. PATENT DOCUMENTS

| | | |
|---|---|---|
| 2012/0301050 A1 | 11/2012 | Wakazono |
| 2013/0120656 A1* | 5/2013 | Wilson ................ G06F 3/1462 348/563 |
| 2013/0121572 A1 | 5/2013 | Paris et al. |
| 2014/0219574 A1 | 8/2014 | Friedhoff et al. |
| 2014/0267916 A1 | 9/2014 | Smith |
| 2014/0269943 A1 | 9/2014 | Richardson |
| 2015/0221280 A1 | 8/2015 | Van Der Vleuten |
| 2015/0245043 A1 | 8/2015 | Greenebaum et al. |
| 2015/0249832 A1 | 9/2015 | Ten et al. |
| 2016/0203618 A1* | 7/2016 | Li ........................ G06T 11/001 345/591 |
| 2016/0358319 A1* | 12/2016 | Xu ...................... H04N 1/4072 |

OTHER PUBLICATIONS

Written Opinion of the International Searching Authority dated Apr. 6, 2017 in connection with International Patent Application No. PCT/KR2016/015245.

Extended European Search Report regarding Application No. 16882045.4, dated Nov. 16, 2018, 8 pages.

Durand et al., "Fast Bilateral Filtering for the Display of High-Dynamic-Range Images", ACM Transactions on Graphics (TOG), vol. 21, No. 3, Jul. 2002, pp. 257-266.

* cited by examiner

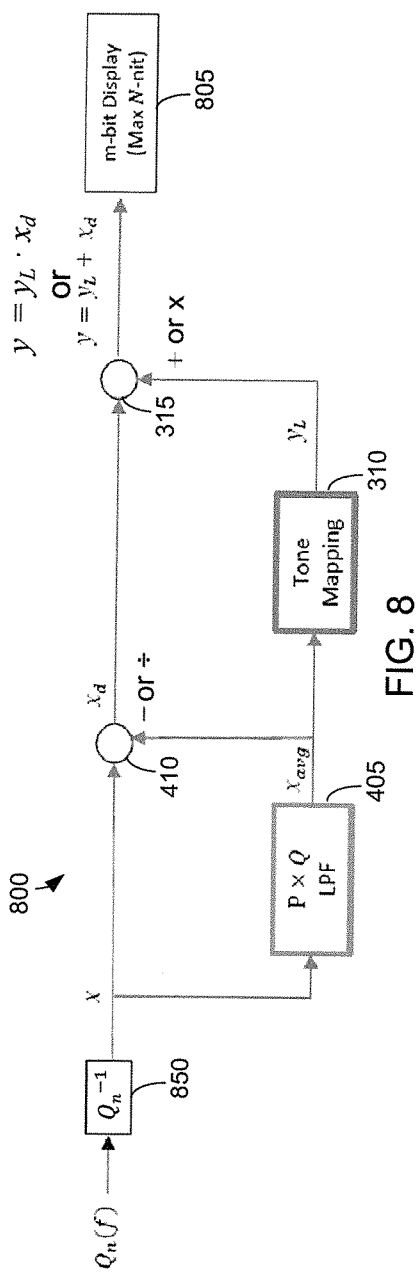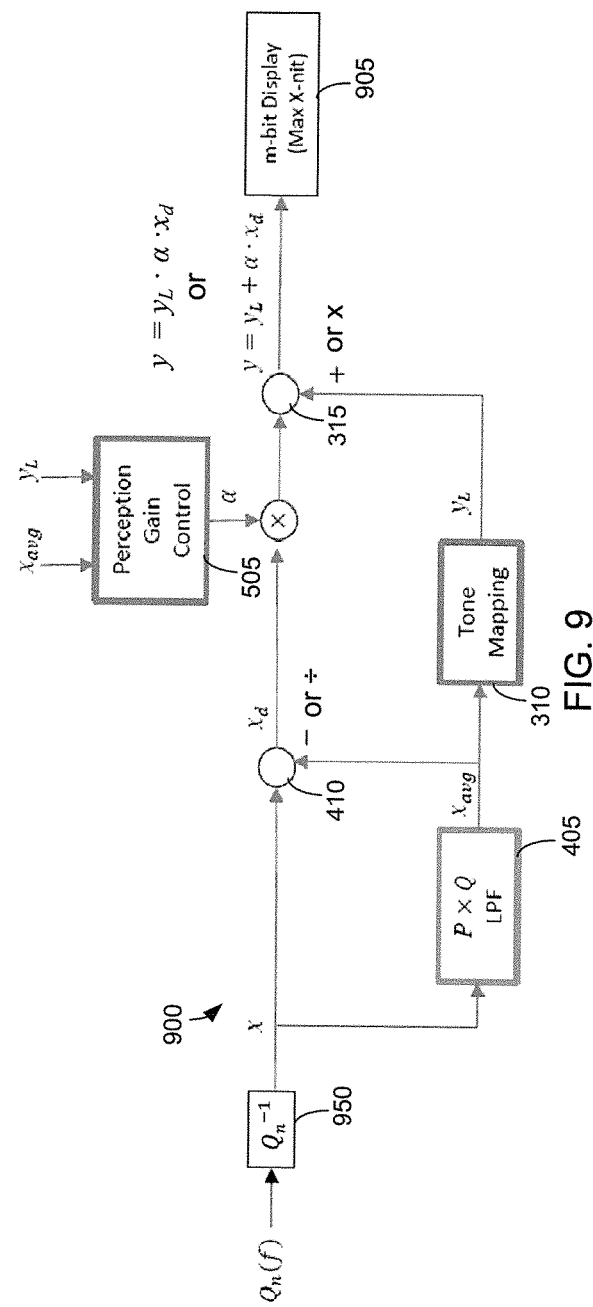

DUAL BAND ADAPTIVE TONE MAPPING

CROSS-REFERENCE TO RELATED APPLICATION(S) AND CLAIM OF PRIORITY

The present application claims priority to U.S. Provisional Patent Application Ser. No. 62/170,042, filed Jun. 2, 2015, entitled "High Dynamic Range Tone Mapping". The content of the above-identified patent document is incorporated herein by reference.

The present application is related to U.S. patent application Ser. No. 14/992,961 filed Jan. 11, 2016, entitled "Tonal-Zone Adaptive Tone Mapping;" U.S. patent application Ser. No. 14/986,548 filed Dec. 31, 2015, entitled "Distribution-Point-Based Adaptive Tone Mapping;" and U.S. patent application Ser. No. 14/986,557 filed Dec. 31, 2015, entitled "Adaptive Tone Mapping Based on Local Contrast." The content of each of these patent documents is incorporated herein by reference.

TECHNICAL FIELD

This disclosure relates generally to video tone processing. More specifically, this disclosure relates to dual-band adaptive tone mapping.

BACKGROUND

At a studio, users can produce mastered videos at using a mastering monitor to optimize or improve the luminance or brightness levels of the original videos. Often times, the mastering monitor used to master the video has different peak luminance or brightness levels than those of target displays upon which the videos are later displayed. Typically, the maximum luminance level of the mastering monitor is much larger than the maximum luminance level of the target display.

SUMMARY

This disclosure provides for dual-band adaptive tone mapping.

In one embodiment, a method for video tone mapping is provided. The method includes processing video data into a first video component and a second video component and applying tone mapping to the first video component. The method further includes scaling the second video component. Additionally, the method includes generating a tone mapped video by combining the tone-mapped first video component with the scaled second video component.

In another embodiment, an apparatus for video tone mapping is provided. The apparatus includes a memory and at least one processor operably connected to the memory. The at least one processor is configured to process video data into a first video component and a second video component; apply tone mapping to the first video component; scale the second video component; and generate a tone mapped video by combining the tone-mapped first video component with the scaled second video component.

In yet another embodiment, a non-transitory computer-readable medium for video tone mapping is provided. The non-transitory computer-readable medium includes program code, that when executed by at least one processor, causes the at least one processor to process video data into a first video component and a second video component, apply tone mapping to the first video component, scale the second video component, and generate a tone mapped video by combining the tone-mapped first video component with the scaled second video component.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), blue ray disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc, an erasable memory device, static RAM, dynamic RAM, or flash memory.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates another example system for implementing dual-band adaptive tone mapping on a target display according to one embodiment of the present disclosure;

FIG. 9 illustrates an example system for implementing dual-band adaptive tone mapping with PGC on a target display according to one embodiment of the present disclosure;

DETAILED DESCRIPTION

Figure 1:
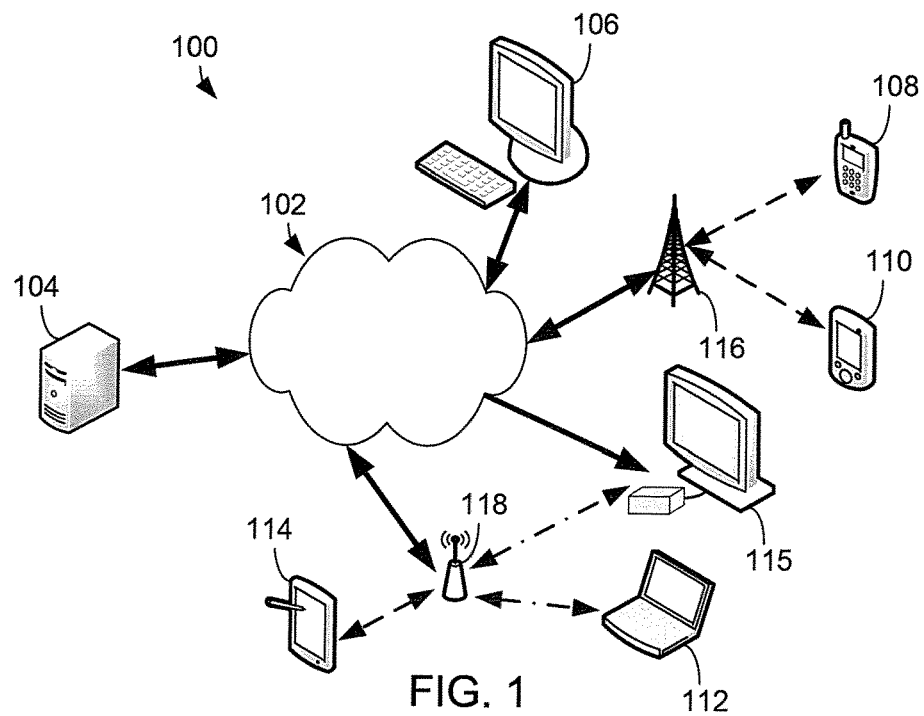
FIG. 1 illustrates an example computing system in which various embodiments of the present disclosure may be implemented.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged video processing system or device.

Embodiments of the present disclosure recognize that displaying the mastered video at on a display with a maximum luminance level that is lower than the maximum luminance level in the mastered video can reduce the quality of the video. For example, portions of the mastered video with luminance levels greater than the maximum luminance level of the target display may be clipped or limited to the maximum luminance level of the target display, thereby limiting the range of luminance values of the video displayed.

Taking an example where a studio already mastered a movie with a mastering monitor having maximum luminance level of M-nit, a user may want the mastered video to have a different peak luminance level of N-nit for a target display where N<M. In such case, the user may need to re-master the original video file using a mastering monitor having a maximum luminance level of N-nit. Embodiments of the present disclosure recognize that this process can be time intensive and costly. In another example, the user may use a tone mapping method using already mastered video to generate a tone mapped video with algorithms or software that down tone maps from the higher mastering monitor luminance level to the lower target display luminance level. Embodiments of the present disclosure recognize that this process can produce unsatisfactory results, such as, saturation of highlighted objects or scenes.

Accordingly, various embodiments of the present disclosure produce a tone mapped video by decomposing a video into two parts. For example, the two parts can refer to reflectance and illumination components or detail and non-detail components. Tone mapping is applied to a first of the video components and the resulting toning mapped component is combined with the second component to form the final tone mapped video. In one or more embodiments, the adaptive tone mapping based on local contrast may reduce costs while providing improved video quality regarding saturation of highlighted objects or scenes.

One or more embodiments relate to processing images for improved rendering images on a display device. In one embodiment, a method comprises one or more applications of tone mapping of images, graphics, video frames, video scenes, and/or full videos (collectively referred to as "video" herein) to facilitate remastering content and/or to facilitate high dynamic range (HDR) display. For example, one or more embodiments are described herein that can facilitate HDR remastering to different luminance peak levels and/or that can facilitate tone mapping for a display having different luminance peak level than that of the mastering monitor. It will be appreciated that the various embodiments disclosed herein can be used either alone or in combination.

In the following, systems and methods are described in greater detail. The symbols p and q, in connection with knee mapping and/or mixed mapping, represent input luminance and target mapping luminance, respectively; the symbol MF, in connection with tone mapping with metadata, represents MaxFALL (maximum frame average luminance level); the symbols T, T1, and T2, in connection with ratio testing, represent predetermined contrast ratio of two different tone mapping results.

FIG. 1 illustrates an example computing system 100 in which various embodiments of the present disclosure may be implemented. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100 on one or more communication channels. The network 102 may communicate Internet Protocol (IP) packets, frame relay frames, or other information between network addresses. The network 102 may include one or more local area networks (LANs): metropolitan area networks (MANs); wide area networks (WANs); all or a portion of a global network, such as the Internet; or any other communication system or systems at one or more locations.

In various embodiments, network 102 includes a broadcast and broadband networks and communication channels for communicating video data (e.g., video files including video content, audio content, and metadata) to client devices 106-115. The broadcasting elements of network 102, such as cable and satellite communication links, provide broadcast of video data to client devices 106-115. The broadband elements of network 102, Internet, wireless, wireline, and fiber optic network links and devices, provide for streaming and download of video data.

The network 102 facilitates communications between one or more servers 104 and various client devices 106-115. Each of the servers 104 includes any suitable computing or processing device that can provide computing services for one or more client devices. Each of the servers 104 could, for example, include one or more processing devices, one or more memories storing instructions and data, and one or more network interfaces facilitating communication over the network 102. For example, one or more of the servers 104 may include processing circuitry for mastering a video or for dual-band adaptive tone mapping, as discussed in greater detail below.

Each client device 106-115 represents any suitable computing or processing device that interacts with at least one server or other computing device(s) over the network 102. As will be discussed in greater detail below, the client devices 106-115 receive video (e.g., a mastered video file to be tone mapped or a tone mapped video file to be displayed) and may include processing circuitry for dual-band adaptive tone mapping. The client devices 106-115 each either includes or is connected to a display device for display of tone mapped video. In this example, the client devices 106-115 include a computer 106, a mobile telephone or smartphone 108, a personal digital assistant (PDA) 110, a laptop computer 112, tablet computer 114; and a set-top box and/or television 115. However, any other or additional client devices could be used in the communication system 100. In this example, some client devices 108-114 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s). For example, in some embodiments, a mastered video file may be received by one or more of the client devices 106-115 on a computer readable medium instead over a wired or wireless communication link in the network 102.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
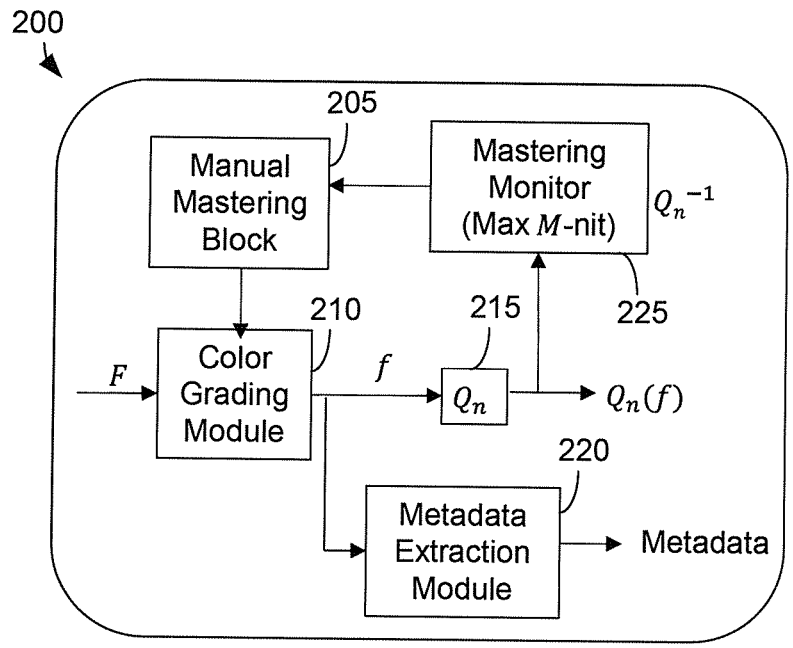
FIG. 2 illustrates a system for generating a mastered video that can be remastered according to embodiments of the present disclosure.

FIG. 2 illustrates a system 200 for generating a mastered video that can be remastered according to embodiments of the present disclosure. The embodiment of the mastered video generating system 200 shown in FIG. 2 is for illustration only. Other embodiments could be used without departing from the scope of the present disclosure. For example, the system 200 may be implemented by the server 104 or the client devices 106-115 in FIG. 1.

During manual mastering block 205, an input master video file F may be graded using a color grading module 210. As outputs, the color grading module 210 provides a mastered video file $f_M$, which is fed as an input to a quantizer $Q_n$ 215 and a metadata extraction module 220. The quantizer $Q_n$ 215 quantizes the mastered video file $f_M$ to produce an n-bit quantized mastered video file $Q_n(f_M)$. The associated maximum luminance level of the video file f is $L_{max}$ nit. The quantizer $Q_n$ 215 quantizes f into $2^n$ levels (i.e., n-bit long binary code) with a pre-determined quantization curve.

The metadata extraction module 220 generates metadata about the mastered video file, for example, maximum luminance level of the mastering monitor 225 (M), maximum content luminance level (MaxCLL) or brightness, MaxFALL, or other properties about the mastered video file. The files $f_M$ and $Q_n(f_M)$ as well as the metadata associated with the mastered video file are be stored in a storage device (e.g., such as storage 915 in FIG. 9 discussed below) for transfer to and later display by a target display device (e.g., one of client devices 106-115).

A mastering monitor 225 de-quantizes the quantized mastered video file for display of the video on the mastering monitor 225. The de-quantization $Q_n^{-1}$ is the inverse operation of the quantization operation of the quantizer $Q_n$ 215. By displaying the mastered video, the mastering monitor 225 provides visual feedback for continued or iterative adjustment of color tones for the manual mastering block 205. However, the mastering monitor 225 may have very high contrast (e.g., has a maximum luminance level of M) in comparison with contrast available on a target display device (e.g., consumer-grade television sets, projectors, mobile phones, etc.) (e.g., having a maximum luminance level of N where M>N). As a result, the mastered video displayed on the mastering monitor 225 may look different than displayed on a target display device. For example, because the mastering monitor 225 can display brighter images than a typical home television set, the bright portions of the mastered video displayed on the home television set may clip and, thus, image details may be lost. For example, portions of in the mastered video having luminance levels above the maximum luminance level of the target display may all be displayed at the same luminance level (i.e., at the maximum luminance level of the target display).

Figure 3:
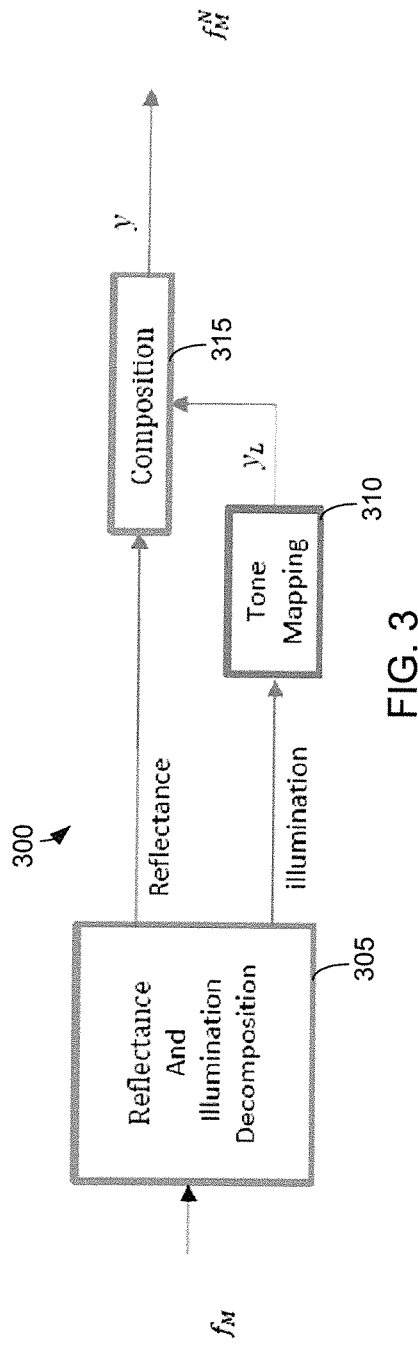
FIG. 3 illustrates an example system for dual-band adaptive tone mapping according to one embodiment of the present disclosure.

FIG. 3 illustrates another example system 300 for dual-band adaptive tone mapping according to one embodiment of the present disclosure. The system 300 may be implemented by the server 104 or the client devices 106-115 in FIG. 1. For example, any of the server 104 or the client devices 106-115 may implement the dual-band adaptive tone mapping techniques discussed herein to convert the mastered video file $f_M$ to the tone mapped video file $f_M^N$. In another example, the client devices 106-115 may receive the mastered video file $f_M$ from the server 104 and may implement the dual-band adaptive tone mapping techniques discussed herein to convert the received mastered video file $f_M$ to the tone mapped video file $f_M^N$. The embodiment of the dual-band adaptive tone mapping system 300 shown in FIG. 3 is for illustration only. Other embodiments could be used without departing from the scope of the present disclosure.

The system 300 is an adaptive tone mapping system that applies adaptive tone mapping in order to remaster high contrast video or to adapt display high contrast video for display on lower contrast displays. For example, the video may be a mastered video file $f_M$ that was mastered using a mastering process, such as implemented by system 200 discussed above. In another example the video file $f_M$ may be any video that has a maximum luminance level above a maximum luminance level of a target display on which the tone mapped video file $f_M^N$ is intended for display.

In this illustrative embodiment, the system 300 includes a reflectance and illumination decomposition block 305, a tone mapping block 310, and a composition block 315. The reflectance and illumination decomposition block 305 decomposes the received video file into reflectance and illumination video components. In this example embodiment, the two video components parts correspond to reflectance and illumination components of the video. For example, the reflectance and illumination components may be based on a reflectance and illumination model, for example, such as, without limitation, a Phong illumination model or Cook and Torrance illumination model. As is discussed in greater detail below, the reflectance and illumination decomposition block 305 may decompose the video taking a low (or high) pass filtered version of the received video file and subtracting (or dividing) the filtered version from the original video to generate the respective reflectance and illumination video components.

The tone mapping block 310 tone maps the illumination video component to produce a tone mapped video $y_L$. For example, the tone mapped video $y_L$ is a video that is down tone mapped from a maximum luminance M associated with the mastering monitor 225 to a maximum luminance N associated with an intended target display, such as, a display associated with one of the client devices 106-115. The tone mapping block 310 may tone map the illumination video component using any number of video tone mapping techniques, including, for example, without limitation, low tone mapping, high tone mapping, adaptive tone mapping based on local contrast, distribution-point-based adaptive tone mapping, tonal-zone adaptive tone mapping, etc. Additional details and examples of video tone mapping techniques may be found in U.S. patent application Ser. No. 14/992,961 filed Jan. 11, 2016, entitled "Tonal-Zone Adaptive Tone Mapping;" U.S. patent application Ser. No. 14/986,548 filed Dec. 31, 2015, entitled "Distribution-Point-Based Adaptive Tone Mapping;" and U.S. patent application Ser. No. 14/986,557 filed Dec. 31, 2015, entitled "Adaptive Tone Mapping Based on Local Contrast," each of which are incorporated by reference herein.

The composition block 315 combines the tone mapped video $y_L$ output from the tone mapping block 310 with the reflectance component to generate the tone mapped video file $f_M^N$ as an output. For example, as discussed in greater detail below, the composition block 315 may sum or multiply the respective outputs to generate the tone mapped video file $f_M^N$ having an $L_{max}$ that is within the maximum luminance N of the intended target display.

By decomposing the received video file into illumination and reflectance components and only tone mapping the illumination component, the system 300 is able to effectively tone map the video for display a lower contrast display while preserving video quality. For example, the system 300 assumes that the reflectance component of the video will not exceed the maximum luminance N of the intended target display. The system 300 is able to preserve details and quality of the reflectance component of the video by not tone mapping this portion and only tone mapping the component of the video likely having luminance exceeding the maximum luminance N of the intended target display.

In one or more embodiments, the system 300 may make an initial selection of whether to apply these tone mapping techniques to the received video file. For example, the system 300 may determine whether or not HDR tone mapping should be applied instead of always applying tone mapping. In one example, the system 300 may identify $L_{max}$ of the received video (e.g., by accessing metadata of the video) and compare $L_{max}$ to at least one tone mapping criterion. For example, the tone mapping criterion may be the $L_{max}$ being greater than the maximum luminance N of the target display (e.g., identified using metadata stored in firmware of the target display) plus an optional additional offset. Then, in response to satisfying the tone mapping criterion, system 300 determines to apply the corresponding tone mapping techniques as discussed herein.

Figure 4:
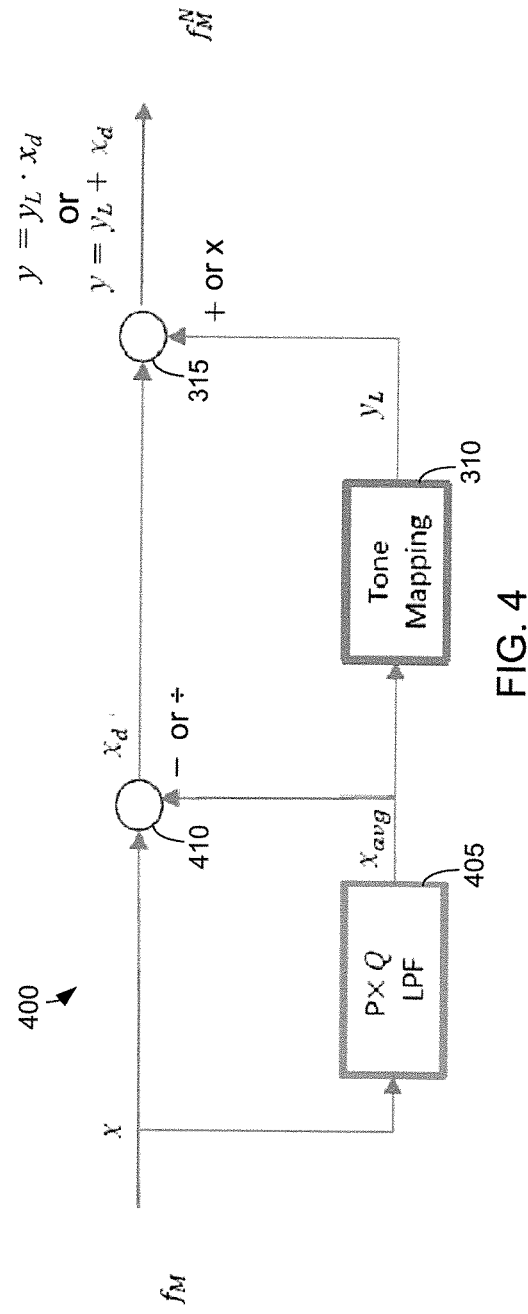
FIG. 4 illustrates another example system for dual-band adaptive tone mapping according to one embodiment of the present disclosure.

FIG. 4 illustrates another example system 400 for dual-band adaptive tone mapping according to one embodiment of the present disclosure. The system 400 may be implemented by the server 104 or the client devices 106-115 in FIG. 1. For example, any of the server 104 or the client devices 106-115 may implement the dual-band adaptive tone mapping techniques discussed herein to convert the mastered video file $f_M$ to the tone mapped video file $f_M^N$. In another example, the client devices 106-115 may receive the mastered video file $f_M$ from the server 104 and may implement the dual-band adaptive tone mapping techniques discussed herein to convert the received mastered video file $f_M$ to the tone mapped video file $f_M^N$. The embodiment of the dual-band adaptive tone mapping system 400 shown in FIG. 4 is for illustration only. Other embodiments could be used without departing from the scope of the present disclosure.

The system 400 is an example embodiment the system 300 in FIG. 3 that alternatively decomposes the received video file into detail components and non-detail components. In this example embodiment, the low-pass filter (LPF) block 405 low-pass filters the received video to form the non-detail component $x_{avg}$. Decomposition block 410 subtracts or divides the non-detail component $x_{avg}$ from the received video to form the detail component $x_d$. Thus, in this example embodiment, the low-pass filter (LPF) block 405 and the decomposition block 410 form the reflectance and illumination decomposition block 305 from FIG. 3.

As discussed above, tone mapping block 310 tone maps the non-detail component $x_{avg}$ to produce the tone mapped video $y_L$. The composition block 315 combines the tone mapped video $y_L$ output from the tone mapping block 310 with the detail component $x_d$ to generate the tone mapped video file $f_M^N$ as an output. For example, composition block 315 may combine the video components according to equations 1 and 2 below.

$$y = y_L \cdot x_d \qquad \text{[Equation 1]}$$

$$y = y_L + x_d \qquad \text{[Equation 2]}$$

Herein, the system 400 sums or multiplies the respective outputs to generate the tone mapped video file $f_M^N$ having an $L_{max}$ that is within the maximum luminance N of the intended target display.

Figure 5:
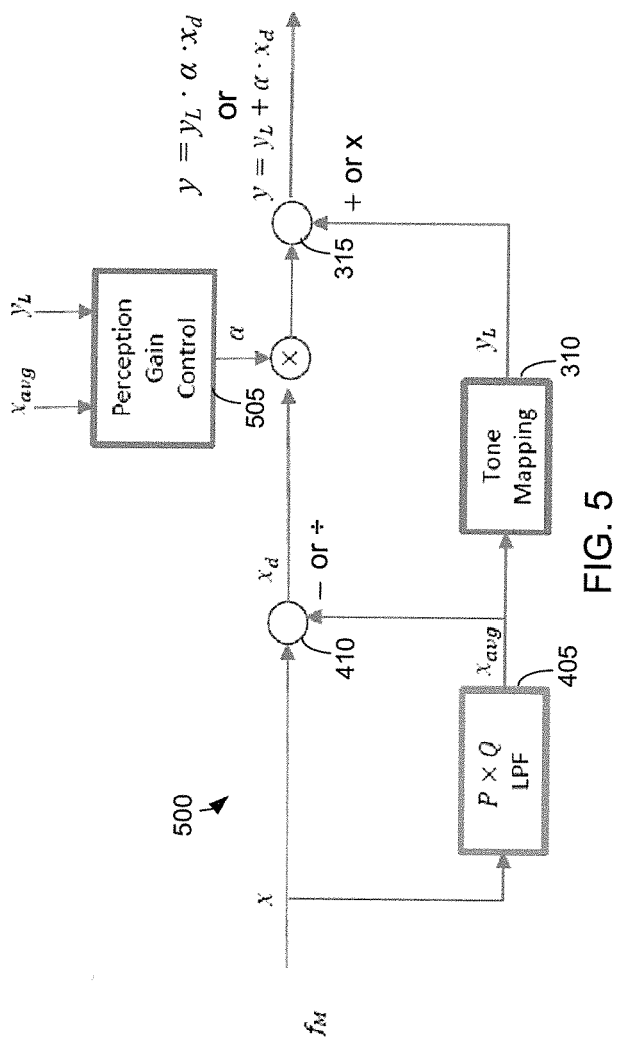
FIG. 5 illustrates an example system for dual-band adaptive tone mapping with perception gain control (PGC) according to one embodiment of the present disclosure.

FIG. 5 illustrates an example system 500 for dual-band adaptive tone mapping with PGC according to one embodiment of the present disclosure. The system 500 may be implemented by the server 104 or the client devices 106-115 in FIG. 1. For example, any of the server 104 or the client devices 106-115 may implement the dual-band adaptive tone mapping techniques discussed herein to convert the mastered video file $f_M$ to the tone mapped video file $f_M^N$. In another example, the client devices 106-115 may receive the mastered video file $f_M$ from the server 104 and may implement the dual-band adaptive tone mapping techniques discussed herein to convert the received mastered video file $f_M$ to the tone mapped video file $f_M^N$. The embodiment of the dual-band adaptive tone mapping system 500 shown in FIG.

5 is for illustration only. Other embodiments could be used without departing from the scope of the present disclosure.

The system 500 is an example embodiment of the system 400 in FIG. 4 with PGC processing applied to the detail (or reflectance) component of the video. In this illustrative example, the system 500 includes PGC block 505 that adjusts the detail component of the video to compensate for different perception levels that may be caused by the tone mapping applied to the non-detail component $x_{avg}$. In other words, the PGC block 505 scales the detail component $x_d$ in accordance with the tone mapping applied to the non-detail component $x_{avg}$ using a calculated PGC parameter a. Example embodiments of the PGC block 505 are described in greater detail in connection with FIGS. 6A-6C.

Figure 6A:
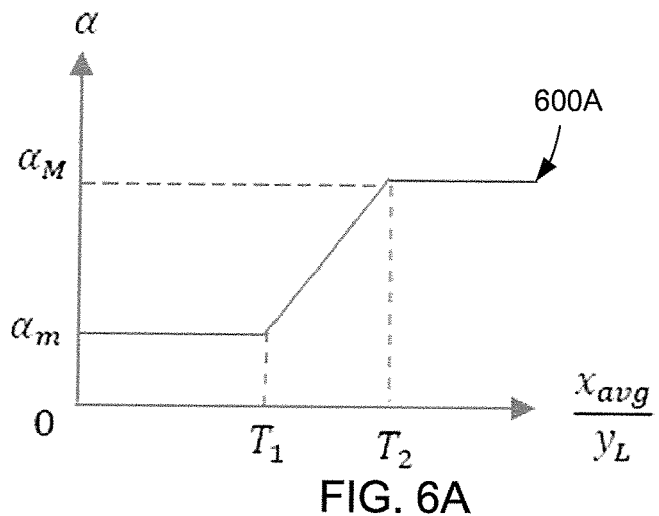
FIGS. 6A-6C illustrate graphs of example relationships between tone mapping ratio and PGC parameter according to embodiments of the present disclosure.
Figure 6B:
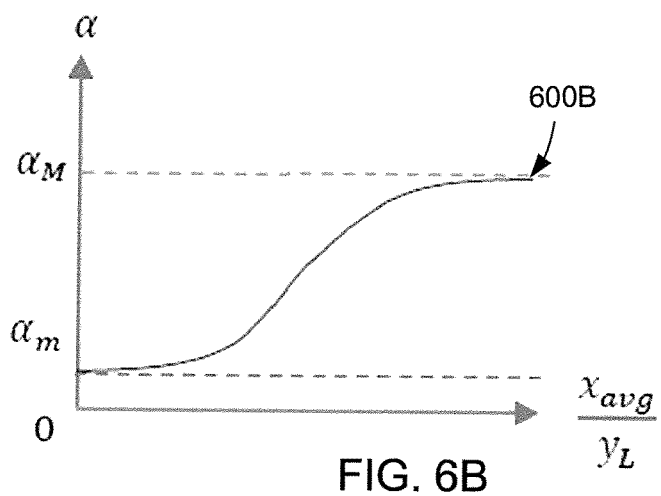
Figure 6C:
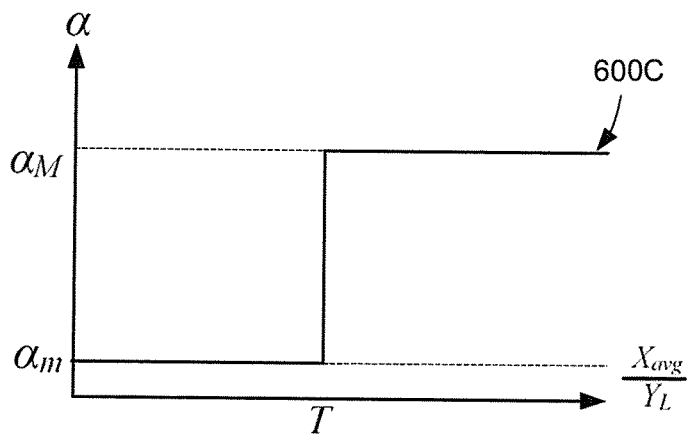

FIGS. 6A-6C illustrate graphs of example relationships 600A-600C between tone mapping ratio and the PGC parameter a according to embodiments of the present disclosure. The example of relationships shown in FIGS. 6A-6C are for illustration only. Other embodiments could be used without departing from the scope of the present disclosure.

FIG. 6A depicts a linear relationship 600A between the tone mapping ratio $x_{avg}/y_L$ and the PGC parameter a with thresholds $T_1$ and $T_2$ for tone mapping ratios to applying minimum and maximum values for the PGC parameter a (e.g., $a_n$, and $a_M$), respectively. In these examples, $a_m$ and $a_M$ are predetermined constant values for applying PGC processing to the detail component $x_d$. The tone mapping ratio $x_{avg}/y_L$ is a ratio for comparison of the tone mapping applied by the tone mapping block 310, i.e., a ratio of the input to the output of the tone mapping block 310. For example, in one or more embodiments, the PGC block 505 receives the input $x_{avg}$ and output $y_L$ of the tone mapping block 310 and calculates the PGC parameter a as a function of $x_{avg}$ and $y_L$ according to one of the example relationships illustrated in FIGS. 6A-6C. FIG. 6B depicts a non-linear relationship 600B between the tone mapping ratio $x_{avg}/y_L$ and the PGC parameter a. FIG. 6C depicts a step-function relationship 600C between the tone mapping ratio $x_{avg}/y_L$ and the PGC parameter a with threshold T for tone mapping ratio for switching between applying minimum and maximum values for the PGC parameter a (e.g., $a_n$, and $a_M$), respectively. For example, the threshold T may involve a determination of whether or not to apply PGC to the detail component $x_d$ at all.

After calculation of the PGC parameter a, the PGC block 505 applies the PGC parameter a to the detail component $x_d$ for combination by composition block 315. For example, composition block 315 may combine the video components using the PGC parameter a according to equations 3 and 4 below.

$$y = y_L \cdot x_d \cdot a \quad \text{[Equation 3]}$$

$$y = y_L + x_d \cdot a \quad \text{[Equation 4]}$$

Herein, the system 400 sums or multiplies the respective outputs to generate the tone mapped video file $f_M^N$ having an $L_{max}$ that is within the maximum luminance N of the intended target display.

In other example embodiments, the system 500 may selectively apply PGC processing to one or more regions of the detail component. For example, the PGC block 505 may perform the analysis of the tone mapping application to portions of a video frame to determine one or more regions of the video frame to apply the PGC processing. This analysis may be based on the amount of tone mapping applied to certain regions of the non-detail component. For example, the system 500 may only apply the PGC processing certain regions of frames of the video or the certain regions of detail component frames of the video where tone mapping in excess of the threshold T was applied. In another example, different portions of a detail component video frame may have may have different values of the parameter a applied. In various embodiments, the PGC block 505 may apply the PGC processing on a frame basis, on a scene by scene basis, for the entire video file, any other suitable amount of a video, or for a single image. In one illustrative example, PGC processing may be applied on a frame by frame basis using a single value for the parameter a for the entire frame.

Figure 7:
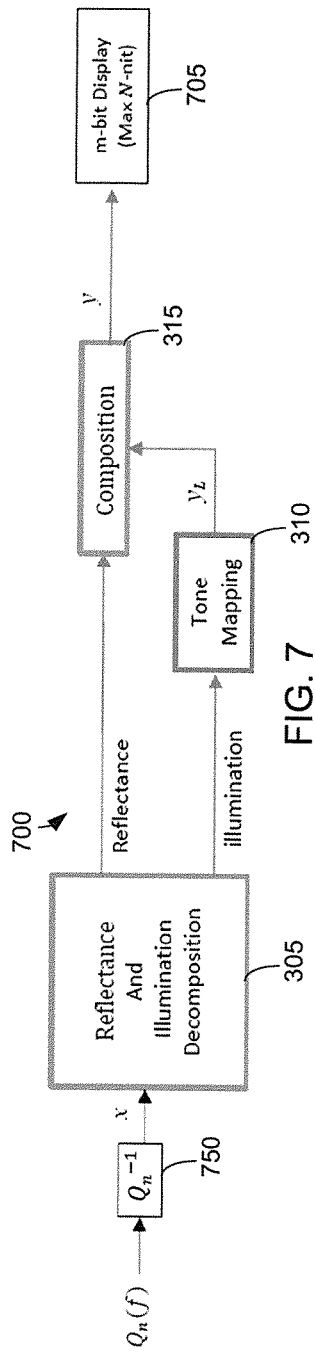
FIG. 7 illustrates an example system for implementing dual-band adaptive tone mapping on a target display according to one embodiment of the present disclosure.

FIG. 7 illustrates an example system 700 for implementing dual-band adaptive tone mapping on a target display 705 according to one embodiment of the present disclosure. The system 700 may be implemented by any one of the client devices 106-115 in FIG. 1. For example, any of the client devices 106-115 may implement the dual-band adaptive tone mapping techniques discussed herein to convert the mastered video file $f_M$ to the tone mapped video file $f_M^N$. The embodiment of the system 700 shown in FIG. 7 is for illustration only. Other embodiments could be used without departing from the scope of the present disclosure.

The system 700 is an example embodiment of the system 300 in FIG. 3 that is implemented in a device that includes or is connected to the target display 705. For example, the system 700 may be any suitable visual media device, such as, but not limited to, a television, set box, cable box, peripheral, media player, computer, mobile phone, tablet, etc. The system 700 receives an n-bit quantized video file $Q_n(f)$ as an input. For example, the system 700 may receive a quantized mastered video from the server 104 over the network 102 or from a storage medium, such as a flash drive, optical disc, or other non-transitory medium. The system 700 and de-quantizes the input to generate the input video x using de-quantizer 750, for example, as discussed above with regard to FIG. 2. The system 700 generates the tone mapped video y using the dual-band adaptive tone mapping techniques discussed above and displays the tone mapped video y on the m-bit target display 705. For example, the system 700 may adaptively tone map the video in advance of the display of the video while the video is being played at the target display 705.

FIG. 8 illustrates another example system for implementing dual-band adaptive tone mapping 800 on a target display 805 according to one embodiment of the present disclosure. The system 800 may be implemented by any one of the client devices 106-115 in FIG. 1. For example, any of the client devices 106-115 may implement the dual-band adaptive tone mapping techniques discussed herein to convert the mastered video file $f_M$ to the tone mapped video file $f_M^N$. The embodiment of the system 800 shown in FIG. 8 is for illustration only. Other embodiments could be used without departing from the scope of the present disclosure.

The system 800 is an example embodiment of the system 400 in FIG. 4 that is implemented in a device that includes or is connected to the target display 805. As discussed above, the system 400 receives an n-bit quantized video file $Q_n(f)$ as an input and de-quantizes the input to generate the input video x using de-quantizer 850, for example, as discussed above with regard to FIG. 2. The system 800 generates the tone mapped video y using the dual-band adaptive tone mapping techniques discussed above and displays the tone mapped video y on the m-bit target display 805. For example, the system 800 may adaptively tone map the video in advance of the display of the video while the video is being played at the target display 805.

FIG. 9 illustrates an example system 900 for implementing dual-band adaptive tone mapping with PGC on a target display 905 according to one embodiment of the present disclosure. The system 900 may be implemented by any one of the client devices 106-115 in FIG. 1. For example, any of the client devices 106-115 may implement the dual-band adaptive tone mapping techniques discussed herein to convert the mastered video file $f_M$ to the tone mapped video file $f_M^N$. The embodiment of the system 900 shown in FIG. 9 is for illustration only. Other embodiments could be used without departing from the scope of the present disclosure.

The system 900 is an example embodiment of the system 500 in FIG. 5 that is implemented in a device that includes or is connected to the target display 905. As discussed above, the system 900 receives an n-bit quantized video file $Q_n(f)$ as an input and de-quantizes the input to generate the input video x using de-quantizer 950, for example, as discussed above with regard to FIG. 2. The system 900 generates the tone mapped video y using the dual-band adaptive tone mapping with PGC techniques discussed above and displays the tone mapped video y on the m-bit target display 905. For example, the system 900 may adaptively tone map the video in advance of the display of the video while the video is being played at the target display 805.

Figure 10:
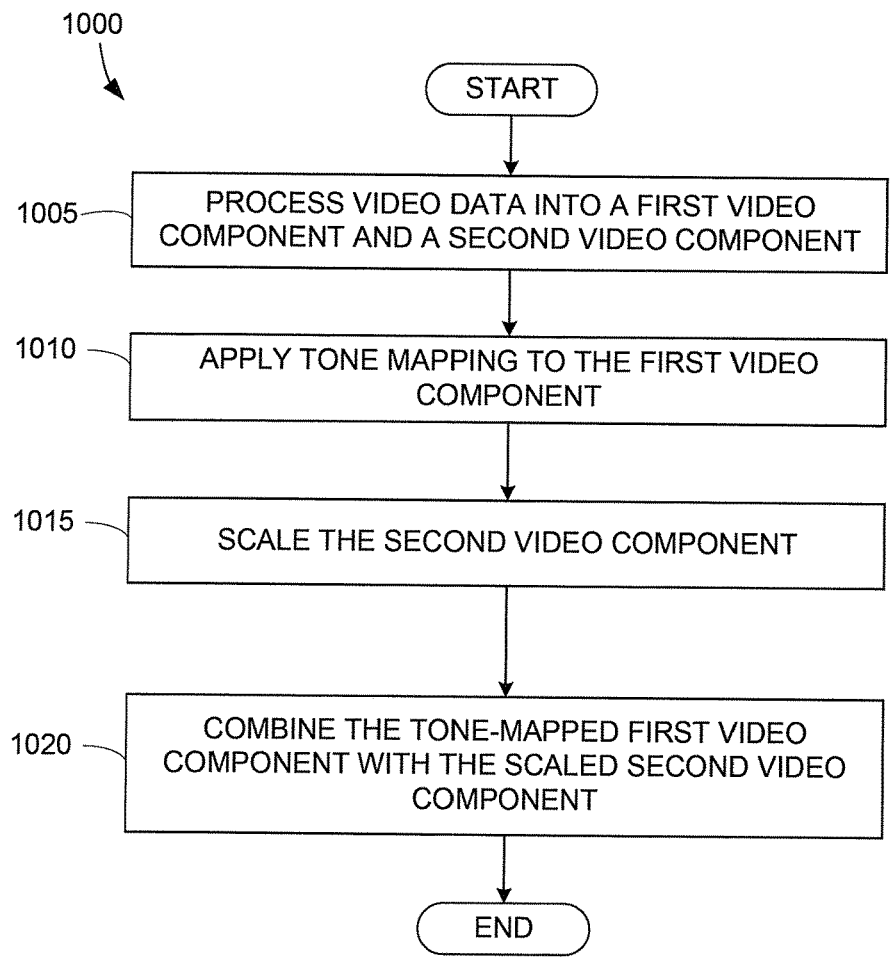
FIG. 10 illustrates an example process for video tone mapping in accordance with one embodiment of the present disclosure.

FIG. 10 illustrates an example process 1000 for video tone mapping in accordance with one embodiment of the present disclosure. For example, the process 1000 may be performed by the server 104 or the client devices 106-115 in FIG. 1. In particular, the process 1000 can be implemented by any one of the systems 300-500 and 700-900 in FIG. 3-5 or 7-9 discussed above, referred to collectively here as "the system." The embodiment of the process 1000 shown in FIG. 10 is for illustration only. Other embodiments could be used without departing from the scope of the present disclosure. While particular blocks of the process 1000 are described below as being performed by specific blocks of one of the systems 300-500 and 700-900, it will be understood that any suitable block can perform each of the blocks of the process 1000 in alternative example embodiments.

The process begins with the system processing video data into a first video component and a second video component (block 1005). For example, block 1005 may be implemented by block 305 in FIG. 3. In this block, the first video component may be an illumination component or non-detail component and the system may low pass filter the video data to generate the illumination component or non-detail component. The second video component may be a reflectance component or detail component and the system may generate the reflectance component or non-detail component by subtracting the illumination component or non-detail component from the video data or dividing the video data by the illumination component or non-detail component to generate the reflectance component or detail component. For example, the video data may be from a mastered video file $f_M$ that was mastered using a mastering process, such as implemented by system 200 discussed above. In another example, the video data may be from any video that has a maximum luminance level above a maximum luminance level of a target display on which the video is intended for display.

The system then applies tone mapping to the first video component (block 1010). For example, block 1010 may be implemented by block 310 in FIG. 3. In this block, the system may apply the tone mapping on a frame by frame basis, on a scene by scene basis, for the entire video file, any other suitable amount of a video, or for a single image. In some embodiments, as part of this block or as another block, the system may also determine whether or not to apply the tone mapping and PGC processing. For example, the system may receive metadata associated with the video data, identify a maximum luminance value for the video data based on the metadata, and determine whether to apply tone mapping and PGC processing to the video data based on comparison of the maximum luminance value for the video to tone mapping criterion associated with the target display.

The system scales the second video component (block 1015). For example, block 1015 may be implemented by block 505 in FIG. 5. In this block, the system may scale the second video component by determining a scaling factor based on the first component and the tone mapped first component. For example, the scaling factor may be based on a ratio of the first component and the tone mapped first component, as discussed above with regard to FIGS. 5-6C. The system may then determine the scaled second video component based on the determined scaling factor. In one embodiment, the scaling of the second video component corresponds to applying perception gain control (PGC) processing. For example, the scaling factor may be a PGC parameter identified by the system as a function of the first video component and the tone-mapped first video component as discussed above with regard to FIGS. 6A-6C. The system may apply the PGC processing based on the calculated PGC parameter. In some embodiments, as part of this block or as another block, the system may also determine whether to apply the PGC processing to one or more regions of the second video component based on properties of one or more corresponding regions of the first video component.

The system then combines the tone-mapped first video component with the scaled second video component (block 1020). For example, block 1020 may be implemented by block 315 in FIG. 3. In this block, the system may generate a tone mapped video with the combination of the tone-mapped first video component with the PGC-processed second video component. In these examples, the second video component may not be tone mapped prior to the combination with the first video component. In some embodiments, as part of this block or as another block, the system may display the generated tone mapped video on the target display. For example, the system may be included in or connected to in one of a television, a monitor, a laptop computer, a tablet computer, and a mobile phone for display of the tone mapped video.

Although FIG. 10 illustrates an example of process for video tone mapping various changes could be made to FIG. 10. For example, while shown as a series of blocks, various blocks in each figure could overlap, occur in parallel, occur in a different order, or occur multiple times.

Figure 11:
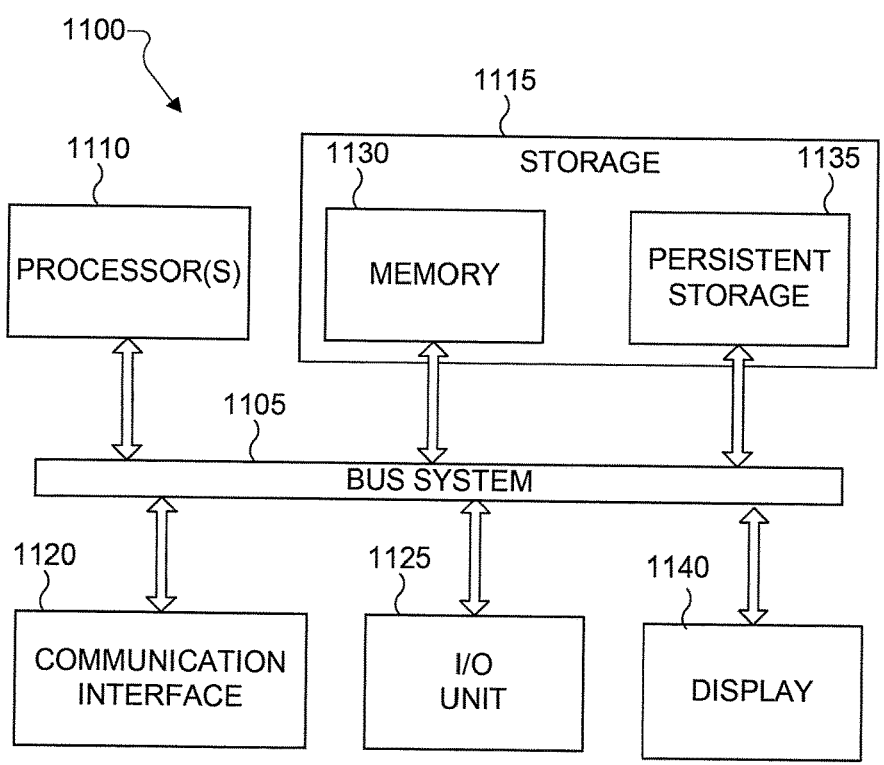
FIG. 11 illustrates an example video processing device according to this disclosure.

FIG. 11 illustrates an example video processing device 1100 according to this disclosure. In particular, the video processing device 1100 illustrates example components that may be included in any one of the server 104 or the client devices 106-115 in FIG. 1 to implement one or more embodiments of the present disclosure.

As shown in FIG. 11, the video processing device 1100 includes a bus system 1105, which supports communication between at least one processor 1110, at least one storage device 1115, at least one communications unit 1120, at least one input/output (I/O) unit 1125, and a display 1140.

The processor 1110 executes instructions that may be loaded into a memory 1130. The processor 1110 may include any suitable number(s) and type(s) of processors or other devices in any suitable arrangement. Example types of processor 1110 include microprocessors, microcontrollers, digital signal processors, field programmable gate arrays, application specific integrated circuits, and discreet circuitry. For example, the processor 1110 may implement tone mapping operations and/or PGC processing performed by any of the blocks or modules in the systems 200-900 being implemented in hardware or by executing stored instructions that causes the processor 1110 to perform the disclosed methods.

The memory 1130 and a persistent storage 1135 are examples of storage devices 1115, which represent any structure(s) capable of storing and facilitating retrieval of information (such as video data, program code, and/or other suitable information on a temporary or permanent basis). The memory 1130 may represent a random access memory or any other suitable volatile or non-volatile storage device(s). For example, the memory 1130 may contain instructions for implementing the tone mapping techniques disclosed herein and/or may store streamed or buffered video data received from a server 104. The persistent storage 1135 may contain one or more components or devices supporting longer-term storage of data, such as a read-only memory, hard drive, Flash memory, or optical disc. For example, the persistent storage 1135 may contain video data such as a mastered video file and metadata associated with the mastered video file.

The communications interface 1120 supports communications with other systems or devices. For example, the communications interface 1120 could include a network interface card, a cable modem, a broadcast receiver, or a wireless transceiver facilitating communications over the network 102. The communications interface 1120 may support communications through any suitable physical or wireless communication link(s).

The I/O unit 1125 allows for input and output of data. For example, the I/O unit 1125 may provide a connection for user input through a keyboard, mouse, keypad, touchscreen, or other suitable input device. The I/O unit 1125 may also send output to the display 1140, printer, or other suitable output device.

The video processing device 1100 further includes or is connected to a display 1140, such as, for example, the target displays 705 and 805. In one example embodiment, the video processing device 1100 may be video processing circuitry included in a set top box, cable box, computer, etc. connected to the display 1140 for tone mapped video to be displayed. In another example embodiment, the video processing device 1100 may be the set top box, cable box, computer, media player, etc. connected to the display 1140 for tone mapped video to be displayed. In yet another example embodiment, the video processing device 1100 may be a server connected to the target display 1140 over a network connection. In another example embodiment, the video processing device 1100 may include the display 1140 that the tone mapped video to be displayed on as well as the video processing circuitry for performing the tone mapping. For example, the video processing device 1100 may be a television, monitor, mobile phone, laptop computer, tablet computer, etc.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, block, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for video tone mapping, the method comprising:
    processing, by at least one processor, video data into a luminance video component and a second video component;
    applying tone mapping to the luminance video component;
    determining a scaling factor based on a ratio of the luminance video component and the tone mapped luminance video component;
    after applying tone mapping and determining the scaling factor, scaling the second video component based on the scaling factor by applying perception gain control (PGC) processing to the second video component; and
    generating a tone mapped video by combining the tone-mapped luminance video component with the scaled second video component.

2. The method of claim 1, wherein:
    the luminance video component is an illumination component, and
    the processing of the video data into the illumination component comprises low pass filtering the video data to generate the illumination component.

3. The method of claim 1, wherein:
    the second video component is a reflectance component, and
    the processing of the video data into the reflectance component comprises one of subtracting the luminance video component from the video data and dividing the video data by the luminance video component to generate the reflectance component.

4. The method of claim 1, wherein:
    the video data is data from a mastered video,
    the second video component is not tone mapped prior to the combination with the luminance video component, and
    the tone mapping is applied to the luminance video component on a frame by frame basis.

5. The method of claim 1, further comprising:
    receiving metadata associated with the video data;
    identifying a maximum luminance value for the video data based on the metadata; and
    determining whether to apply tone mapping to the video data based on comparison of the maximum luminance value for the video data to tone mapping criterion associated with a target display.

6. The method of claim 1, further comprising:
    displaying the generated tone mapped video on a display, wherein the display is present in one of a television, a monitor, a laptop computer, a tablet computer, and a mobile phone.

7. The method of claim 1, further comprising scaling the second video component using a PGC parameter, wherein maximum and minimum values of the PGC parameter are based on the scaling factor.

8. The method of claim 1, further comprising selectively applying the PGC processing to one or more regions of the second video component.

9. An apparatus comprising:
a memory; and
at least one processor operably connected to the memory, the at least one processor configured to:
process video data into a luminance video component and a second video component;
apply tone mapping to the luminance video component;
determine a scaling factor based on a ratio of the luminance video component and the tone mapped luminance video component;
after applying tone mapping and determining the scaling factor, scale the second video component based on the scaling factor by applying perception gain control (PGC) processing to the second video component; and
generate a tone mapped video by combining the tone-mapped luminance video component with the scaled second video component.

10. The apparatus of claim 9, wherein:
the luminance video component is an illumination component, and
the at least one processor is configured to low pass filter the video data to generate the illumination component.

11. The apparatus of claim 9, wherein:
the second video component is a reflectance component, and
the at least one processor is configured to one of subtract the luminance video component from the video data and divide the video data by the luminance video component to generate the reflectance component.

12. The apparatus of claim 9, wherein:
the video data is data from a mastered video,
the second video component is not tone mapped prior to the combination with the luminance video component, and
the tone mapping is applied to the luminance video component on a frame by frame basis.

13. The apparatus of claim 9, wherein the at least one processor is configured to:
identify metadata associated with the video data;
identify a maximum luminance value for the video data based on the metadata; and
determine whether to apply tone mapping to the video data based on comparison of the maximum luminance value for the video data to tone mapping criterion associated with a target display.

14. The apparatus of claim 9, further comprising:
a display configured to display the generated tone mapped video,
wherein the apparatus is one of a television, a monitor, a laptop computer, a tablet computer, and a mobile phone.

15. A non-transitory computer-readable medium comprising program code, that when executed by at least one processor, causes the at least one processor to:
process video data into a luminance video component and a second video component;
apply tone mapping to the luminance video component;
determine a scaling factor based on a ratio of the luminance video component and the tone mapped luminance video component;
after applying tone mapping and determining the scaling factor, scale the second video component based on the scaling factor by applying perception gain control (PGC) processing to the second video component; and
generate a tone mapped video by combining the tone-mapped luminance video component with the scaled second video component.

16. The computer-readable medium of claim 15, wherein:
the luminance video component is an illumination component, and
the program code, that when executed by the at least one processor, causes the at least one processor to process of the video data into the illumination component comprises program code, that when executed by the at least one processor, causes the at least one processor to low pass filter the video data to generate the illumination component.

* * * * *